DANIEL MATER, Jr.
Improvement in Wagons.
No. 120,758.	Patented Nov. 7, 1871.
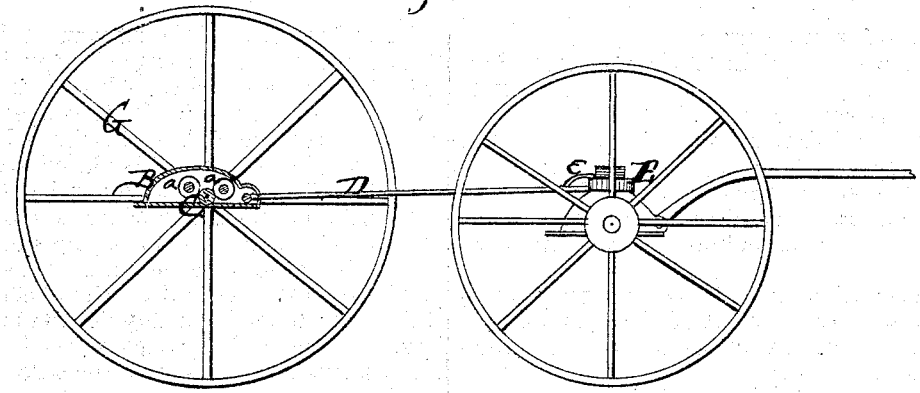
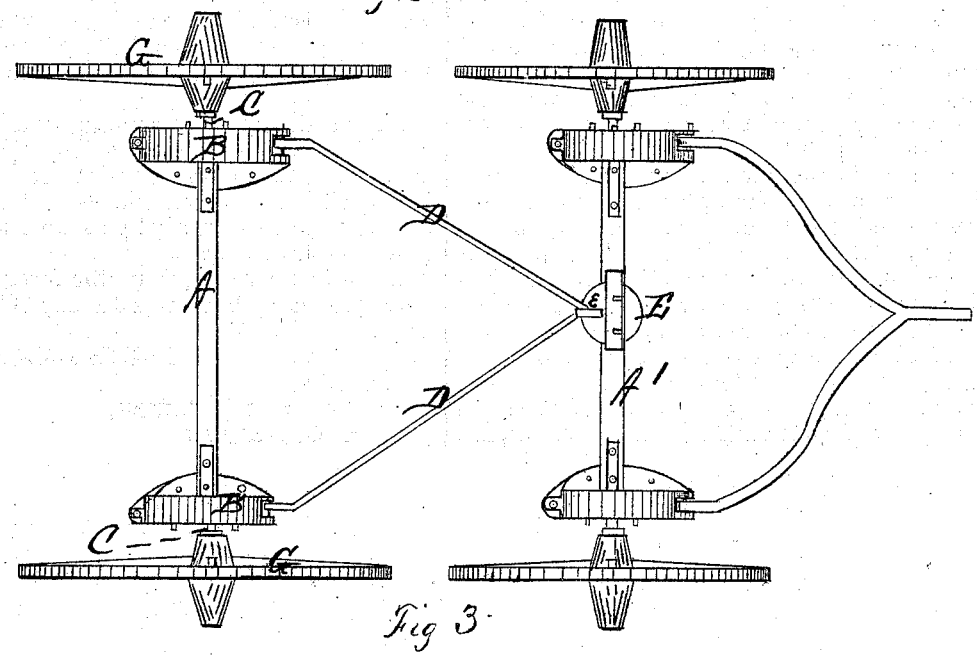
Witnesses:	Inventor
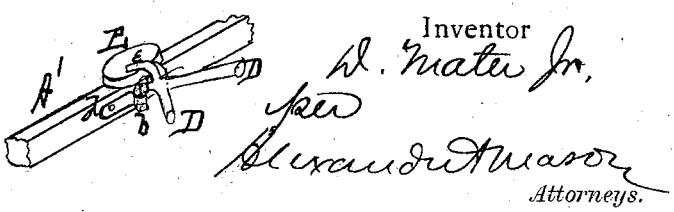

UNITED STATES PATENT OFFICE.

DANIEL MATER, JR., OF BELLMORE, INDIANA.

IMPROVEMENT IN WAGONS.

Specification forming part of Letters Patent No. 120,758, dated November 7, 1871.

*To all whom it may concern:*

Be it known that I, DANIEL MATER, Jr., of Bellmore, in the county of Parke and in the State of Indiana, have invented certain new and useful Improvements in Wagons; and do hereby declare that the following is a full, clear, and exact description thereof, reference being had to the accompanying drawing and to the letters of reference marked thereon making a part of this specification.

The nature of my invention consists in the construction and arrangement of the running-gear of wagons or other vehicles, as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a plan view of the running-gear of a wagon. Fig. 3 is a section of the coupling.

A represents the hind bolster, having upon each end a box, B, through which the axle C passes under the bolster. Upon each end of the axle is a small collar or flange, which projects through a slot in the bottom of the boxing B to prevent the bolster from moving endwise on the axle. Within each box B are two friction-rollers, $a$ $a$, placed above and one on each side of the axle, against which rollers the axle impinges. From the front end of each of said boxes B a rod, D, passes forward and inward, as shown, the front ends of said rods being connected, and forming a downward-projecting hook, $b$, which is inserted in a loop or eye, $d$, attached to the rear side of the front bolster A$'$. On the upper side of the joined ends of the rods D D is formed a forward-projecting hook, $e$, which is placed over the fifth-wheel, E, said hook forming a guide for the fifth-wheel. The front bolster A$'$ is provided with boxes and the front axle arranged in the same in precisely the same manner as described for the hind bolster and axle. The wheels G G upon the axles are made in any desired manner, and one wheel is firmly secured to each axle, while the other wheel turns upon the axle.

The arrangement of the axle passing through a box with friction-rollers may be applied on any vehicle or conveyance moving on wheels.

Having thus fully described my invention, what I claim as new, and desire to secure by Letters Patent, is—

The within-described running-gear for wagons, consisting of the bolsters A, boxes B with rollers $a$, axles C, coupling D with hooks $b$ $e$, eye or loop $d$, fifth-wheel E, and wheels G, all constructed and arranged substantially as and for the purposes herein set forth.

In testimony that I claim the foregoing I have hereunto set my hand this 6th day of September, 1871.

DANIEL MATER, JR.

Witnesses:
LEONARD E. ACKER,
O. G. HARLAN. (31)